United States Patent [19]

Cornet et al.

[11] Patent Number: 5,264,239

[45] Date of Patent: Nov. 23, 1993

[54] PREPARATION OF DRIED FLAVORED MEATS

[75] Inventors: Paul-Emile Cornet, Blonay; Sven Heyland, Weiningen, both of Switzerland

[73] Assignee: Nestec S.A., Vevey, Switzerland

[21] Appl. No.: 56,253

[22] Filed: Apr. 30, 1993

Related U.S. Application Data

[63] Continuation-in-part of Ser. No. 572,877, Aug. 24, 1990, abandoned, and a continuation-in-part of Ser. No. 772,774, Oct. 7, 1991, abandoned.

[30] Foreign Application Priority Data

Oct. 12, 1989 [CH] Switzerland .................. 3710/89
Nov. 7, 1990 [CH] Switzerland .................. 3531/90

[51] Int. Cl.⁵ ............................................. A23L 1/314
[52] U.S. Cl. .................................... 426/641; 426/456; 426/472
[58] Field of Search ............. 426/533, 641, 456, 472, 426/646, 652, 473, 92, 535, 589

[56] References Cited

U.S. PATENT DOCUMENTS

| | | | |
|---|---|---|---|
| 1,536,308 | 5/1925 | Remus | 426/473 |
| 3,552,978 | 1/1971 | Inklaar | 426/641 |
| 3,865,958 | 2/1975 | Breukink et al. | 426/652 X |
| 3,930,046 | 12/1975 | Baugher | 426/533 |
| 4,218,487 | 8/1980 | Jaeggi | 426/533 |
| 4,466,986 | 8/1984 | Guggenbuehler et al. | 426/533 |
| 4,559,234 | 12/1985 | Rubin et al. | 426/652 |
| 4,879,130 | 11/1989 | Heyland et al. | 426/533 |

FOREIGN PATENT DOCUMENTS

| | | |
|---|---|---|
| 659256 | 5/1965 | Belgium . |
| 0087769A1 | 3/1983 | European Pat. Off. . |
| 0288405A2 | 10/1988 | European Pat. Off. . |
| 217980A1 | 1/1985 | Fed. Rep. of Germany . |
| 1538975 | 8/1968 | France . |
| 185110 | 5/1923 | United Kingdom ............... 426/646 |

OTHER PUBLICATIONS

Salomon, "The Meat Flavors", Food Manufacture, Mar. 1943, p. 91.

Primary Examiner—Arthur L. Corbin
Attorney, Agent, or Firm—Vogt & O'Donnell

[57] ABSTRACT

A flavor enhanced dehydrated meat is prepared by first heating a mixture of a reducing sugar and a sulfur-containing substance to partly react the sugar and sulfur-containing substance, and then the partly reacted mixture is added to a cooked meat which then is heated to react the sugar and sulfur-containing substance further and to dry the meat containing the reacted mixture. The reducing sugar and substance may be added to and reacted in a concentrated juice obtained from cooking meat.

24 Claims, No Drawings

PREPARATION OF DRIED FLAVORED MEATS

CROSS REFERENCE TO RELATED APPLICATIONS

This application is a continuation-in-part application of application Ser. No. 07/572,877, filed Aug. 24, 1990, and of application Ser. No. 07/772,774, filed Oct. 7, 1991, both now abandoned.

BACKGROUND OF THE INVENTION

This invention relates to preparation of dehydrated meat.

It is known that flavoring agents can be incorporated into reconstituted meat, such as in German Patent Document DE 217 980, for example, wherein such flavoring agents are prepared from a hydrolyzate of ground bones which may be subjected to a Maillard reaction.

As disclosed in French Patent Specification 1 538 975, a dehydrated pre-cooked meat capable of being rapidly reconstituted is prepared by cooking the meat, mixing the cooked meat with a salt and sodium glutamate additives, dehydrating the cooked meat and then coating the dehydrated meat with a fat. However, the meat taste of the reconstituted product is not very pronounced. The meat taste can be strengthened by addition to the meat of a flavoring agent obtained, for example, by thermal reaction of an amino acid with a reducing sugar and a fat.

SUMMARY OF THE INVENTION

The problem addressed by the present invention was to obtain a dehydrated meat which has good organoleptic properties and a pronounced meat taste and which keeps for long periods.

The processes according to the invention are distinguished, in particular, by carrying out a thermal flavor-producing reaction in two steps. The reaction is initiated during a heat-treatment of a mixture containing a reducing sugar and a sulfur-containing substance to partly react those compositions, in the presence or absence of a concentrated meat juice, to bring about a partial development of flavorant aromas. The flavor development reaction is completed during a second heating step which is employed to dry cooked meat to which the reaction mixture of the partly reacted sugar and sulfur-containing substance has been added. In the course of the second heating to dry the meat and further react the reaction mixture, the aromas penetrate into the meat and become attached, or fixed, to the meat fibers, possibly reacting with the constituents of the meat. The dried flavored meat thus obtained has a pronounced and characteristic meat taste which it retains for a long time.

One advantage of the processes according to the invention is that they enable a dehydrated product to be obtained which combines good organoleptic qualities, namely a characteristic meat taste, with good keeping properties, by enabling the aromas to be fully developed and effectively attached by a mild heat-treatment. Another advantage of the process is that the taste of the flavored meat can be varied by varying the proportions of the various constituents.

To these ends, one process according to the invention for the preparation of a dried, flavored meat is characterized in that a mixture of a reducing sugar and a sulfur-containing substance is heated and reacted for a time so that only a part of the reducing sugar and sulfur-containing substance of the mixture is reacted, thereby forming a partly reacted mixture, in that the partly reacted reaction mixture is added to cooked meat, from which cooking juice and fat have been separated, and in that the cooked meat and added partly reacted reaction mixture then are heated to further react the reducing sugar and sulfur-containing substance of the partly reacted reaction mixture and to dry the cooked meat containing the further reacted mixture to obtain a flavored dehydrated meat.

The present invention also includes a process wherein the reducing sugar and sulfur-containing substance are first partly reacted in juice which has been obtained from cooking of meat and which has been concentrated.

Further, the present invention also includes a process characterized in that a meat is cooked, juice and fats are separated from the cooked meat, the juice obtained is concentrated, a reducing sugar and a sulfur-containing substance are mixed with the concentrated juice and the juice mixture then is heated for a time so that only a part of the concentrated juice, reducing sugar and sulfur-containing substance of the juice mixture is reacted, thereby forming a partly reacted reaction mixture, in that the partly reacted reaction mixture is added to a cooked meat from which cooking juices and fats have been separated, and in that the cooked meat and added partly reacted reaction mixture are heated to further react the reducing sugar, sulfur-containing substance and juice of the partly reacted reaction mixture and to dry the cooked meat containing the further reacted reaction mixture to obtain a flavored dehydrated meat.

The processes according to the invention can be carried out semi-continuously or continuously.

DETAILED DESCRIPTION OF THE INVENTION

In the practice of the present invention, meats, including beef and poultry, may be used to carry out the processes according to the invention. Before cooking, the meat may have been completely or partly freed from bones and skin. The meat also may have been cut up, for example into from 1 kg to 10 kg pieces, to provide for rapid cooking.

The meat may be cooked for from 40 mins to 120 mins at a temperature of from 95° C. to 140° C. under a pressure of from 1.3 bar to 1.8 bar. Poultry, such as chicken, may be cooked for from 40 mins to 60 mins at a temperature of from 120° C. to 125° C. and under a pressure of from 1.6 bar to 1.7 bar, and beef may be cooked for from 90 mins to 110 mins under the noted temperature and pressure conditions.

Before cooking a meat to obtain a cooked meat and/or juice employed in the processes of the invention, an antioxidant-containing composition may be added to the meat and may include citric acid and water. The antioxidant-containing composition added may be, for example, a composition containing from 1.5% to 2% by weight of an antioxidant such as, for example, propylene glycol, or propyl- or octyl-gallate, or butyl-hydroxyanisole, or a mixture thereof, and containing from 7.5% to 8% poultry fat and from 90% to 91% concentrated meat juice having a dry matter content of from 38% to 40%.

In one particular embodiment, from 15 parts to 20 parts by weight water, from 0.01 part to 0.03 part by weight citric acid and from 0.02 part to 0.05 part by weight of the above-mentioned antioxidant-containing composition are added to 100 parts by weight poultry meat, such as chicken, before cooking. In another particular embodiment, from 20 parts to 25 parts by weight water, from 0.01 part to 0.02 part by weight citric acid and from 0.05 part to 0.08 part by weight of the above-mentioned antioxidant-containing composition are added to 100 parts by weight beef before cooking.

After cooking a meat, the cooking juice and fat may be separated from the cooked meat, for example by draining or decanting the cooking juice and the fat from the cooked meat. The cooked meat then may be deboned and cut into small pieces.

In the embodiment of the processes of the invention wherein concentrated cooking juice is employed, the cooking juice may be concentrated, for example by evaporation under reduced pressure, to a dry matter content of between about 35% and 45% by weight and preferably, between 38% and 42% by weight. For example, the juice may be concentrated by evaporation for from 30 mins to 40 mins at a temperature of from 48° C. to 50° C. under a pressure of the order of from 20 mbar to 30 mbar.

In the practice of the processes of the invention, the reducing sugar may be, for example, a monosaccharide and, more particularly, a pentose, such as xylose or arabinose, or a hexose, such as glucose or fructose, or a galacturonic acid, or a mixture of these compounds. The sulfur-containing substance may be, for example, cysteine, cystine, methionine, or thiamine, or a mixture of various sulfur-containing substances.

The reaction mixture depending upon its composition may be worked, or kneaded, for example for from 10 mins to 15 mins with a stirrer rotating at from 100 RPM's to 120 RPM's to give it a homogeneous pasty or dough-like texture, and the reaction mixture, depending upon its composition may be worked, for example with a stirrer rotating at 80 RPM's to 120 RPM's, during all or part of the heat-treatment to homogenize its texture and to ensure the correct transfer of heat, i.e., a uniform reaction, throughout its mass.

The reaction mixture, depending upon its composition, may be partly reacted by heat-treatment for from 30 mins to 240 mins at a temperature of from 90° C. up to 100° C. and preferably, at a temperature of from 95° C. to 97° C. The heat-treatment may be carried out under reflux to prevent water present in the mixture from evaporating.

The partial reaction may be carried out, for example, in a jacketed tank into which steam may be injected for from 5 mins to 25 mins to heat the mixture to a temperature of from 90° C. to 100° C., after which the mixture is left to react for from 25 mins to 215 mins at a temperature of from 95° C. to 97° C. under a pressure of from 1 bar to 2 bar.

After the partial reaction, the mixture may be rapidly cooled, for example by circulating cold water through the jacket, to stop the reaction. The mixture may be cooled so that a mixture having a temperature of from 60° C. to 70° C. is obtained within a period of from 5 mins to 10 mins or to a temperature of from 40° C. to 50° C. within a period of from 10 mins to 20 mins.

The partly reacted mixture then is added to a cooked and deboned meat cut into small pieces to obtain a meat to be dried.

In a particular embodiment wherein juice is not employed in the flavor development reaction mixture, a mixture containing from 7 parts to 15 parts by weight reducing sugar and from 1 part to 7 parts by weight of at least one sulfur-containing substance is prepared. In this embodiment, water is added to the mixture formed to obtain a dry matter content of from 70% to 85% by weight, and the mixture may be worked, for example for from 10 mins to 15 mins, with a stirrer rotating at 100 RPM's to 120 RPM's to give it a homogeneous pasty or dough-like texture.

The mixture may also contain from 0 to 12 parts by weight sodium glutamate, from 0 to 2 parts by weight inosine monophosphate and from 0 to 1 part by weight vegetable fat. The mixture may additionally contain from 0 to 20 parts by weight sodium chloride.

The mixture is partly reacted by a heat-treatment preferably at a temperature of from 93° C. to 99° C. for from 40 mins to 240 mins. The mixture may be worked, for example with a stirrer rotating at 80 RPM's to 100 RPM's, during all or part of the heat treatment, which may be carried out under reflux.

After the heat-treatment, the mixture may be rapidly cooled to stop the reaction and to obtain a mixture having a temperature of from 60° C. to 70° C. after from 5 mins to 10 mins.

A salt, such as sodium chloride, may be added to the heat-treated mixture to obtain a paste-like mixture which is easier to handle. The salt may be added in a quantity of from 0 to 2.5 parts by weight per 10 parts by weight of treated mixture, after which the salt-containing mixture may be worked for from 5 mins to 15 mins at a temperature of from 60° C. to 70° C. to obtain a homogeneous mixture.

The mixture formed is added to cooked meat cut into small pieces, to which an antioxidant-containing composition also may be added. The mixture formed is added preferably in a quantity of from 1 parts to 3 parts by weight mixture per 10 parts by weight cooked meat and worked, or kneaded, with a stirrer to obtain a homogeneous product.

The flavored meat thus obtained is then dried, for example for from 4 hrs to 8 hrs at from 65° C. to 80° C. under a pressure of from 10 mbar to 30 mbar, to a dry matter content of from 96% to 99% by weight.

In a second process embodiment according to the invention wherein a concentrated juice is employed, a mixture may be prepared which contains 100 parts by weight concentrated juice, from 4 parts to 14 parts by weight reducing sugar and from 12 parts to 35 parts by weight of at least one sulfur-containing substance. When employing chicken juice, it is possible to use a mixture containing from 8 parts to 10 parts by weight xylose and from 0 to 2 parts by weight glucose. When employing beef juice, it is possible to use a mixture containing from 5 parts to 7 parts by weight xylose and from 0 to 2 parts by weight glucose. In these embodiments, a mixture containing from 8 parts to 23 parts by weight cysteine and from 4 parts to 12 parts by weight thiamine may be used. In one particular embodiment, wherein chicken juice is employed, a mixture containing from 15 parts to 20 parts by weight cysteine and from 7 parts to 10 parts by weight thiamine may be used, and in one particular embodiment wherein the beef juice is employed, a mixture containing from 8 parts to 12 parts by weight cysteine and from 5 parts to 7 parts by weight thiamine may be used.

In addition, a reaction mixture may contain from 0 to 35 parts by weight sodium glutamate, from 0 to 8 parts by weight inosine monophosphate and 0 to 25 parts by weight sodium chloride. Also, the fat produced during cooking of the meat may be completely or partly added to the mixture. For example, from 0 to 80 parts by weight fat may be added per 100 parts by weight concentrated juice.

In this embodiment, the mixture is partly reacted by heat-treatment for from 30 mins to 240 mins, wherein the mixture is heated for from 5 mins to 25 mins to a temperature of from 90° C. and 100° C. and preferably, to a temperature of from 95° C. to 97° C. after which the mixture is left to react for from 25 mins to 215 mins at preferably 95° C. to 97° C. under a pressure of from 1 bar to 2 bar.

After the partial reaction, the mixture is cooled rapidly, to stop the reaction and obtain a treated mixture having a temperature of from 40° C. to 50° C. after from 10 mins to 20 mins.

The partly reacted mixture is then added to the cooked and deboned meat cut into small pieces.

Additives such as salt, egg white, or antioxidant compositions may also be added to the meat.

In one particular further aspect of the second embodiment of the processes according to the invention, a flavored meat to be dried is prepared which contains 100 parts by weight cooked chicken, from 10 parts to 25 parts by weight treated mixture, from 5 parts to 10 parts by weight sodium chloride, from 0 to 3 parts by weight egg white and from 0 to 2 parts by weight anti-oxidant composition. In another particular embodiment, a flavored meat to be dried is prepared which contains 100 parts by weight cooked beef, from 8 parts to 25 parts by weight treated mixture, from 4 parts to 10 parts by weight sodium chloride, from 0 to 5 parts by weight egg white and from 0 to 2 parts by weight anti-oxidant-containing composition.

The flavored meat is then dried under reduced pressure in an oven for from 3 hrs to 10 hrs at a temperature of from 80° C. to 98° C. and under a pressure of from 10 mbar to 50 mbar. The partial reaction between the concentrated juice sulfur-containing compound and reducing sugar is thus completed during this drying step.

The dried flavored meat may be size-reduced to granules, for example from 3 mm to 6 mm in size for chicken and from 5 mm to 10 mm in size for beef. The meat may have a dry matter content of from 97% to 99% by weight, a salt content of from 13% to 16% by weight and a fat content of from 27% to 35% by weight, for example.

The dehydrated meat obtained by the processes of the invention has a characteristic taste of chicken or beef, for example, and will keep for periods of up to at least 9 months.

EXAMPLES

The invention is illustrated in more detail in the following Examples in which parts and percentages are by weight.

Example I

An antioxidant-containing composition containing 132 g propylene glycol, 40 g butylhydroxyanisole, 20 g propyl gallate, 8 g citric acid, 800 g poultry fat and 9 kg meat juice concentrated to 40% by weight dry matter is prepared.

100 kg deboned beef in the form of 25 kg pieces, 20 liters water, 10 g citric acid and 50 g antioxidant-containing composition are introduced into an autoclave. The meat is cooked for 100 mins at a temperature of approximately 120° C. under a pressure of 1.7 bar.

After cooking, the juice and the fat are separated from the cooked meat by draining.

58.3 kg cooked meat are obtained. It is cut into pieces and put aside.

A mixture containing 1.7 kg glucose, 0.27 kg cystein, 0.81 kg xylose, 2.1 kg sodium chloride, 1.8 kg sodium glutamate, 0.16 kg inosine monophosphate and 0.08 kg vegetable fat is prepared in a jacketed tank, approximately 1.5 liters water being added to obtain a dry matter content of 82%. The mixture is worked for 10 mins with a stirrer rotating at 100 RPM's, after which the mixture is heated with continued stirring by introduction of steam into the double-jacket. The mixture is left to react for 1 hour at a temperature of 97° C. to 98° C. The mixture is then cooled to a temperature of approximately 65° C. by introduction of cold water into the jacket. 1.5 kg sodium chloride are added to the mixture thus obtained, and the salt containing mixture is worked for 10 mins at 65° C. 9.9 kg heat-treated mixture having a dry matter content of 85% are obtained.

A flavored meat to be dried containing 50 kg cooked beef, 7.0 kg treated mixture, 1.5 kg egg white and 0.3 kg antioxidant-containing composition then is prepared. The meat is worked for 20 mins using a stirrer rotating at 50 RPM's to obtain a homogeneous product.

The flavored meat then is dried in an oven for 6 hrs under a reduced pressure of 15 mbar at approximately 70° C. to a dry matter content of approximately 98% by weight and a water activity of 0.2. The dried flavored meat then is ground to a particle size of approximately 2 mm.

26 kg dehydrated flavored meat having a characteristic taste of beef are obtained.

EXAMPLE II 150 kg poultry meat in the form of whole chickens, each weighing approximately 1 kg, and 25 liters water, 15 g citric acid and 30 g of an antioxidant-containing composition, prepared as in Example I, are introduced into an autoclave.

The meat is cooked for 40 mins at a temperature of approximately 120° C. under a pressure of 1.7 bar.

After cooking, the juice and the fat are separated from the cooked meat, the meat is completely deboned and then is cut into small pieces. 68.5 kg deboned meat are obtained.

A mixture containing 1.6 kg glucose, 1.3 kg cysteine, 0.25 kg xylose, 1.9 kg sodium chloride, 1.6 kg sodium glutamate, 0.15 kg inosine monophosphate, 0.08 kg vegetable fat and approximately 1.5 liters water is prepared. It has a dry matter content of 82% by weight.

The mixture is worked for 10 mins at 100 RPM and then heated with continued stirring to 97° C. to 99° C. The mixture is left to react for 1 hour at that temperature and then is cooled to 65° C.

1.5 kg sodium chloride is added to the mixture thus obtained. The salt-containing mixture is worked for 10 mins at 65° C., and 9.8 kg heat-treated mixture having a dry matter content of 85% are obtained.

A flavored meat to be dried containing 50 kg cooked and cut poultry meat, 7.0 kg treated mixture, 0.5 kg egg white and 0.3 kg antioxidant-containing composition is prepared. The meat obtained is worked at 50 RPM's for 20 mins and is then dried for 6 hrs at 70° C. under a pressure of 15 mbar to reach a dry matter content of 98% by weight and a water activity of 0.2.

The flavored meat then is ground into granules approximately 2 mm in size. 25 kg dehydrated flavored meat having a characteristic taste of poultry is obtained.

EXAMPLE III

The flavored meats prepared in accordance with Examples I and II are stored at various temperatures for 24 months. During this time, samples of flavored meat are taken and reconstituted for consumption by immersion in a stock for 5 mins at 95° C. to 100° C.

The reconstituted samples are tasted and their organoleptic characteristics are marked on a scale of 1 to 9 as a function of the storage temperature and storage time. a mark of 9 representing a meat having hood organoleptic qualities and a pronounced meat taste and a mark of 5 representing the limit below which the meat is no longer organoleptically edible.

The results obtained for the flavored beef prepared in accordance with Example I are set out in Table 1, and the results obtained for the flavored poultry meat prepared in accordance with Example II are set out in Table 2.

TABLE 1

|  |  | Storage time (months) |  |  |  |  |  |  |  |
| --- | --- | --- | --- | --- | --- | --- | --- | --- | --- |
|  | Storage temp. | 1 | 3 | 6 | 9 | 12 | 15 | 18 | 24 |
| Appearance | 4° C. | 9 | 9 | 9 | 9 | 9 | 9 | 9 | 9 |
| and colour | 20° C. | 9 | 9 | 9 | 9 | 9 | 9 | 9 | 9 |
|  | 25° C. | 9 | 9 | 9 | 9 | 9 | 9 | 9 | 9 |
|  | 30° C. | 9 | 9 | 9 | 9 | 9 | 9 | 8.5 | 8 |
| Odour | 4° C. | 9 | 9 | 9 | 9 | 9 | 9 | 9 | 9 |
|  | 20° C. | 9 | 8.5 | 8.5 | 8.5 | 8.5 | 8 | 8 | 7.5 |
|  | 25° C. | 9 | 8.5 | 8.5 | 8 | 8 | 7.5 | 7.5 | 7 |
|  | 30° C. | 8.5 | 8 | 8 | 8 | 7 | 7 | 7 | 6 |
| Taste and | 4° C. | 9 | 9 | 9 | 9 | 9 | 9 | 9 | 9 |
| quality | 20° C. | 9 | 8.5 | 8.5 | 8.5 | 8 | 8 | 8 | 7.5 |
|  | 25° C. | 8.5 | 8 | 8 | 8 | 8 | 7.5 | 7.5 | 6.5 |
|  | 30° C. | 8 | 7.5 | 7.5 | 7.5 | 7 | 7 | 7 | 5.5 |

Consistency: consistency remains constant at a value of 9, irrespective of the storage temperature and storage time

TABLE 2

|  |  | Storage time (months) |  |  |  |  |  |  |  |
| --- | --- | --- | --- | --- | --- | --- | --- | --- | --- |
|  | Storage temp. | 1 | 3 | 6 | 9 | 12 | 15 | 18 | 24 |
| Appearance | 4° C. | 9 | 9 | 9 | 9 | 9 | 9 | 9 | 9 |
| and colour | 20° C. | 9 | 9 | 9 | 9 | 9 | 9 | 9 | 9 |
|  | 25° C. | 9 | 9 | 9 | 9 | 9 | 9 | 9 | 9 |
|  | 30° C. | 9 | 9 | 9 | 9 | 9 | 8 | 8 | 8 |
| Odour | 4° C. | 9 | 9 | 9 | 9 | 9 | 9 | 9 | 9 |
|  | 20° C. | 9 | 8.5 | 8.5 | 8.5 | 8 | 8 | 8 | 7.5 |
|  | 25° C. | 9 | 8.5 | 8 | 8 | 7.5 | 7 | 7 | 6.5 |
|  | 30° C. | 8.5 | 8 | 8 | 7.5 | 6.5 | 6 | 6 | 5.5 |
| Taste and | 4° C. | 9 | 9 | 9 | 9 | 9 | 9 | 9 | 9 |
| quality | 20° C. | 9 | 8.5 | 8.5 | 8 | 7.5 | 7 | 7 | 6.5 |
|  | 25° C. | 8.5 | 8 | 8 | 7.5 | 7 | 6 | 6 | 5.5 |
|  | 30° C. | 8 | 7 | 7 | 6.5 | 5.5 | 5 | 5 | 4.5 |

Consistency: consistency remains constant at a value of 9, irrespective of the storage temperature and storage time

EXAMPLE IV

An antioxidant-containing composition containing 132 g propylene glycol, 40 g butyl hydroxyanisole, 20 g propyl gallate, 8 g citric acid, 800 g chicken fat and 9 kg meat juice concentrated to 40% by weight dry matter is prepared.

100 kg deboned beef in the form of pieces, each weighting 25 kg, and 20 liters water, 10 g citric acid and 50 g antioxidant composition are introduced into an autoclave. The meat is cooked for 100 mins at a temperature of the order of 120° C. under a pressure 1.7 bar.

After cooking, the cooked meat is separated from the juice and the fats by draining. 30 kg juice containing 8.5% by weight, 58.3 kg cooked meat and 11.3 kg fats are obtained.

The cooked meat is cut into small pieces and kept.

The juice is concentrated in an evaporator for about 30 mins at 48° C. under a pressure of 25 mbar. 6.1 kg concentrated juice having a dry matter content of 40% by weight is obtained.

A mixture containing 4.3 kg concentrated juice, 0.49 kg cysteine, 0.25 kg thiamine, 0.24 kg xylose, 0.15 kg inosine monophosphate, 0.68 kg sodium glutamate and 1.0 kg sodium chloride then is prepared in a jacketed tank. The mixture is kneaded first for 10 mins with a stirrer rotating at 100 RPM's and then is heated with continued stirring by introduction of steam into the jacket. It takes approximately 12 mins to reach a temperature of 95° C. to 96° C. in the mixture. The mixture is left to react at that temperature for 27 mins before being cooled to a temperature of 45° C.

7.1 kg heat-treated mixture are obtained in this way.

A flavored meat to be dried containing 50 kg cooked beef, 7.1 kg treated mixture, 2.8 kg sodium chloride, 1.5 kg egg white and 0.3 kg antioxidant-containing composition then is prepared. The meat is kneaded for 20 mins with a stirrer rotating at 50 RPM's to obtain a homogeneous product.

The flavored meat then is dried in an oven for 6 hrs at approximately 90° C. under 10 mbar to a dry matter content of approximately 98% by weight.

The dried flavored meat then is size-reduced to granules approximately 8 mm in size. 34.3 kg flavored dehydrated meat with a characteristic taste of beef in the form of granules approximately 8 mm in size containing 14% by weight NaCl and 27.5% by weight fats are obtained.

EXAMPLE V 150 kg chicken in the form of whole birds, each weighing approximately 1 kg, and 25 liters water, 15 g citric acid and 30 g of the antioxidant composition prepared as described in Example IV are introduced into an autoclave.

The meat is cooked for 40 mins at a temperature of the order of 120° C. under a pressure of 1.7 bar.

After cooking, the cooked meat is separated from the juice and the fats. The meat is completely deboned and then cut into small pieces. 37.8 kg juice containing 3.5% by weight dry matter, 68.5 kg deboned meat, 13 kg bones and 11 kg fats are obtained.

The juice is concentrated in an evaporator for about 45 mins at 48° C. under a pressure of 25 mbar, giving 3.3 kg concentrated juice having a dry matter content of 40% by weight.

A mixture containing 2.4 kg concentrated juice, 1.3 kg fats, 0.48 kg cysteine, 0.24 kg thiamine, 0.24 kg xylose, 0.15 kg inosine monophosphate and 0.67 kg sodium glutamate is then prepared. The mixture is kneaded for 10 mins at 100 RPM's and then is heated while stirring at 97° C. to 99° C. It takes about 12 mins to reach a temperature of 96° C. in the mixture. The mixture then is left to react for 27 mins at that temperature and is then cooled to 45° C. 5.4 kg heat-treated mixture are obtained.

A flavored meat to be dried is prepared, containing 50 kg cooked and cut chicken, 5.4 kg treated mixture, 4.0 kg sodium chloride, 0.5 kg egg white and 0.3 kg antioxidant composition. The meat obtained is kneaded at 50 RPM's for 20 mins and then is dried for 4.5 hrs at 90° C. under a pressure of 10 mbar to a dry matter content of 98% to 98.5% by weight.

The flavored meat is then size-reduced to granules approximately 3 mm in size.

31.1 kg flavored dehydrated meat with a characteristic taste of chicken and containing 15.7% by weight NaCl and 34.3% by weight fats are obtained.

As is clear from the foregoing, various modifications of the present invention may be made without departure from the spirit and scope of the disclosure, and the invention may be practiced suitably in the absence of elements not specifically disclosed herein.

We claim:

1. A process for preparing a dehydrated meat product comprising heating a mixture of a reducing sugar and a sulfur-containing substance for a time so that only a part of the reducing sugar and sulfur-containing substance of the mixture is reacted, thereby forming a partly reacted reaction mixture, adding the partly reacted reaction mixture to cooked meat from which cooking juice and fat have been separated and then heating the cooked meat and added partly reacted reaction mixture to further react the reducing sugar and sulfur-containing substance of the partly reacted reaction mixture and to dry the cooked meat containing the further reacted mixture to obtain a dehydrated flavored meat.

2. A process according to claim 1 further comprising, before cooking the meat, adding an antioxidant-containing composition to the meat and after cooking the meat, separating cooking juice and fat from the cooked meat.

3. A process according to claim 1 further comprising adding an antioxidant-containing composition to the cooked meat.

4. A process according to claim 1 or 2 wherein the reducing sugar and sulfur-containing substance mixture is heated for from 40 mins to 240 mins at a temperature of from 93° C. to 99° C. and then cooled to stop the reaction.

5. A process according to claim 4 wherein the cooked meat and added partly reacted reaction mixture are heated at a temperature of from 65° C. to 80° C. under a pressure of from 10 mbar to 30 mbar for from 4 hrs to 8 hrs to obtain a dry matter content of from 96% to 99% by weight.

6. A process according to claim 4 wherein the mixture of the reducing sugar and sulfur-containing substance contains the reducing sugar in an amount of from 7 parts to 15 parts by weight and the sulfur-containing substance in an amount of from 1 part to 7 parts by weight, and wherein the partly reacted reaction mixture is added to the cooked meat in an amount of from 1 part to 3 parts partly reacted reaction mixture to 10 parts cooked meat by weight.

7. A process according to claim 5 wherein the mixture of the reducing sugar in an amount of from 7 parts to 15 parts by weight and the sulfur-containing substance in an amount of from 1 part to 7 parts by weight and the partly reacted reaction mixture is added to the cooked meat in an amount of from 1 part to 3 parts partly reacted reaction mixture to 10 parts cooked meat by weight.

8. A process according to claim 1 wherein a substance selected from the group consisting of sodium glutamate in an amount up to 12 parts by weight, inosine monophosphate in an amount up to 1 part by weight and sodium chloride in an amount up to 20 parts by weight is added to and heated with the reducing sugar and sulfur-containing substance to obtain the partly reacted reaction mixture.

9. A process according to claim 1 further comprising adding sodium chloride to the partly reacted reaction mixture prior to heating to further react and dry the partly reacted reaction mixture.

10. A process according to claim 1 further comprising concentrating the cooking juice separated from the cooked meat, mixing the concentrated juice with the mixture of the reducing sugar and sulfur-containing substance and heating the mixture to obtain the partly reacted reaction mixture.

11. A process for preparing a dehydrated meat product comprising cooking meat and then separating juice and fat from the cooked meat, concentrating the juice separated from the cooked meat, mixing a reducing sugar and a sulfur-containing substance with the concentrated juice to form a juice mixture, heating the juice mixture for a time so that only a part of the concentrated juice, reducing sugar and sulfur-containing substance of the juice mixture is reacted, thereby forming a partly reacted reaction mixture, adding the partly reacted reaction mixture to the cooked meat, heating the cooked meat and added partly reacted reaction mixture to further react the reducing sugar, sulfur-containing substance and juice of the partly reacted reaction mixture and to dry the cooked meat containing the further reacted mixture to obtain a dehydrated flavored meat.

12. A process according to claim 11 further comprising, before cooking the meat, adding an antioxidant-containing composition to the meat.

13. A process according to claim 2 or 12 wherein the antioxidant-containing composition includes citric acid and water.

14. A process according to claim 1 or 10 or 11 further comprising cooling the partly reacted reaction mixture to stop the reaction prior to adding the partly reacted reaction mixture to the cooked meat.

15. A process according to claim 1 or 10 or 11 wherein the reducing sugar is selected from the group of sugars consisting of xylose, glucose and fructose and mixtures thereof and wherein the sulfur-containing substance is selected from the group of sulfur-containing substances consisting of cysteine, cystine, methionine and thiamine and mixtures thereof.

16. A process according to claim 11 wherein the juice, reducing sugar and sulfur-containing substance are mixed to form a juice mixture comprising 100 parts by weight juice, from 4 to 14 parts by weight reducing sugar and from 12 to 35 parts by weight sulfur-containing substance.

17. A process according to claim 11 wherein the juice mixture is heated for from 30 mins to 240 mins at a temperature of from 90° C. to 100° C. and wherein the partly reacted reaction mixture is heated and dried with the cooked meat for from 3 hours to 10 hours at a temperature of from 80° C. to 98° C. under a pressure of from 10 mbar to 50 mbar.

18. A process according to claim 11 wherein the meat is cooked for from 40 mins to 120 mins at a temperature of from 95° C. to 140° C. under a pressure of from 1.3 bar to 1.8 bar.

19. A process according to claim 11 wherein the juice is concentrated to a dry matter content of between about 35% and 45% by weight.

20. A process according to claim 11 wherein the reducing sugar is xylose and the sulfur-containing substance is a mixture of from 8 parts to 23 parts by weight cysteine and of from 4 parts to 12 parts by weight thiamine.

21. A process according to claim 11 wherein the juice mixture further comprises at least one of sodium glutamate, inosine monophosphate, sodium chloride and fat so that the reaction mixture contains, per 100 parts by weight concentrated juice, at least one of sodium glutamate up to 35 parts by weight, sodium chloride up to 5 up to 8 parts by weight, sodium chloride up to 5 parts by weight and fats up to 80 parts by weight.

22. A process according to claim 11 wherein the meat is chicken and wherein from 10 parts to 25 parts by weight of the juice mixture are added to 100 parts by weight of the cooked chicken, and further comprising adding from 5 parts to 10 parts by weight sodium chloride, from 0 to 3 parts by weight egg white and from 0 to 2 parts by weight of an antioxidant-containing composition to the cooked chicken.

23. A process according to claim 11 wherein the meat is beef and wherein from 8 parts to 25 parts by weight of the juice mixture are added to 100 parts by weight of the cooked beef and further comprising adding, from 4 parts to 10 parts by weight sodium chloride, from 0 to 5 parts by weight egg white and 0 to 2 parts by weight antioxidant-containing composition to the cooked beef.

24. A process according to claim 11 further comprising adding fat separated from the meat to the juice mixture.

* * * * *

UNITED STATES PATENT AND TRADEMARK OFFICE
CERTIFICATE OF CORRECTION

PATENT NO. : 5,264,239
DATED : November 23, 1993
INVENTOR(S) : Paul-Emile Cornet, et al It is certified that error appears in the above-indentified patent and that said Letters Patent is hereby corrected as shown below:

Column 9, line 54, delete "in an amount of from 7 parts";
Column 9, line 55, delete "to 15 parts by weight" and delete "the";
Column 9, line 56, after "stance", insert --contains the reducing sugar in an amount of from 7 parts to 15 parts by weight and the sulfur-containing substance--,
Column 11, line 6, delete "sodium chloride up to 5" and insert therefor --inosine monophosphate--.

Signed and Sealed this

Tenth Day of May, 1994

Attest:

BRUCE LEHMAN

Attesting Officer

Commissioner of Patents and Trademarks